Patented Mar. 4, 1952

2,587,791

UNITED STATES PATENT OFFICE 2,587,791

RESINOUS COPOLYMERIZATION PRODUCTS FROM AROMATIC FULVENES

Ralph B. Thompson, Hinsdale, and Herman S. Bloch, Chicago, Ill., assignors to Universal Oil Products Company, Chicago, Ill., a corporation of Delaware No Drawing. Application June 27, 1950, Serial No. 170,683

15 Claims. (Cl. 260—83.7)

This application is a continuation-in-part of our co-pending application Serial No. 708,934, filed November 9, 1946, now Patent No. 2,512,698, June 27, 1950.

This invention relates to the production of resinous materials, characterized as co-polymers in which one of the reactant monomers is an aromatic fulvene. More specifically, the invention concerns a method for producing resinous materials possessing either thermo-plastic or thermo-setting properties, depending upon the specific reactants selected, wherein a fulveno-substituted aromatic compound is co-polymerized with a polymerizable hydrocarbon monomer containing mono- or di-olefinic unsaturation.

In a broad embodiment thereof, the present invention concerns a process for the production of a resinous material which comprises co-polymerizing a nuclearly fulveno-substituted aromatic compound with an unsaturated hydrocarbon containing from 1 to 2 olefinic double bonds per molecule.

A more specific embodiment of the invention relates to a process for the production of a resinous material which comprises co-polymerizing an unsaturated hydrocarbon containing from one to two olefinic double bonds per molecule with a nuclearly fulveno-substituted aromatic compound in which the fulvene radical is attached to the aryl nucleus through the acyclic carbon atom of said fulveno radical at a temperature of from about 25 to about 300° C. in the presence of a peroxidic polymerization catalyst.

It is an object of this invention to provide a process for the production of a wholly hydrocarbonaceous resinous material which is compatible with and soluble in hydrocarbon solvents. Another object of the invention is to produce a resinous material which contains residual conjugated olefinic unsaturation such that when the resin is exposed as a thin film to atmospheric oxidation, either alone or in admixture with other solvents or drying oils, it undergoes further polymerization and/or oxidation to form a tough, protective film.

Other objects of the invention and additional embodiments thereof relating to specific aspects of the present process and the products thereof will be referred to in greater detail in the following further description of the invention.

The fulvenes, the aromatic substituted derivatives of which comprise one class of reactants utilized in the present process are characterized structurally as unsaturated cyclic compounds containing at least a total of 6 carbon atoms per molecule, the cyclic portion of which is a cyclopentadiene having attached thereto, through an olefinic double bonded linkage, a hydrocarbon radical of at least one carbon atom in chain length. The olefinic bond between the alpha carbon atom of the unsaturated hydrocarbon radical and the carbon atom of the cyclopentadiene nucleus to which the hydrocarbon radical is attached thus establishes a conjugated trienic linkage between the carbon atoms of the fulvene radical. The fulveno-substituted aryl compounds contemplated as reactants in the present process are represented by the following structural formula:

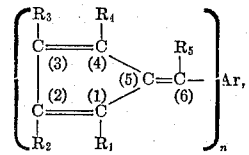

wherein each of the substituents: $R_1$, $R_2$, $R_3$, $R_4$, and $R_5$ are radicals selected from the group consisting of hydrogen, alkyl, alkenyl, cycloalkyl, aryl, arylalkyl, and cycloalkenyl groups, Ar represents an aryl group of mono- or polycyclic structure, and $n$ is 1 or 2. Typical aryl substituted fulvenes include derivatives in which the aryl substituents occupy one or both bonds on the acyclic carbon atom of the fulvene structure indicated above, such as 6-methyl-6-phenyl-fulvene, formed by the condensation of acetophenone with cyclopentadiene, 6,6-diphenyl-fulvene, formed by the condensation of diphenylketone with cyclopentadiene, including homologs of both the aryl and alkyl substituents attached to the acyclic carbon atom of the fulvene radical as well as derivatives thereof containing other substituents such as nitro, amino, hydroxyl, halo, sulfo, etc. groups. Other typical derivatives of fulvene include the alkyl, alkenyl, aryl, etc. derivatives in which the latter groups occupy positions on the cyclopentadienyl portion of the fulvene structure, including such typical compounds as 2,3-dimethylfulvene, 4,5-dibutylfulvene, etc. Although any one or more of the above aryl substituted derivatives of fulvene are generally utilizable as a reactant in the copolymerization process of this invention, it is not to be presumed that said derivatives are equally effective as reactants in the copolymerization reaction or necessarily equivalent from the standpoint of producing products of equivalent quality. In some instances and for some uses of the resultant resinous product, it may be preferred to employ an aryl-substituted fulvene containing one or more highly unsaturated hydrocarbon substituents, such as the derivatives containing alkenyl or alkadienyl side chains. When the unsaturated groups differ sufficiently in reactivity from the fulvene unsaturation, a partially polymerized copolymer may be obtained which is subject to further polymerization or to subsequent "air drying" following the initial polymerization, producing a product which may be incorporated into paint, varnish, and other air-drying compositions in which the resinous component itself undergoes oxidation to form extremely tough, abrasion-resistant films.

As previously noted, the substituted fulvene derivatives in which the substituents occupy the acyclic carbon atom of the basic fulvene structure may be prepared by simple condensation of cyclopentadiene with a ketone, the substituents attached to the keto group of the ketone reactant being identical with the substituents which occupy the acyclic carbon atom of the resultant fulvene compound. In the case of the condensation of cyclopentadiene with an aromatic ketone, one of the substituents on the acyclic carbon atom of the fulvene product will be the aromatic residue attached to the keto group of the initial ketone reactant. Further, when the initial ketone is an aliphatic or cycloaliphatic compound, said aliphatic or cycloalkyl radical will appear in the corresponding 6-position or the acyclic carbon atom of the fulvene product. In order to form substituted fulvenes in which the substituents occupy the 1,2,3, and/or 4-positions of the cyclopentadienyl portion of the resultant fulvene molecule, the correspondingly substituted cyclopentadiene is selected as a reactant in the initial condensation with the ketone to form the fulvene compound.

The condensation of an aryl ketone and cyclopentadiene or its various substituted derivatives to form the present aryl-substituted fulvene reactant is preferably effected in the presence of an alkaline medium, such as an alkali alcoholate, represented for example, by a methanol solution of sodium methylate and preferably also in the presence of a solvent of one or both of the reactants to thereby reduce the tendency of the resultant aromatic polyfulvene produce to undergo immediate polymerization following the formation. Typical of the aryl ketones utilizable as reactants for the preparation of the aromatic fulvene reactant are such mono-aryl ketones as aceto-phenone, phenylethyl ketone, p-methylacetophenone, phenylcyclohexyl ketone, and such aromatic diketones as ortho-, meta-, and para-diacetylbenzenes; the various acyl- and polyacyl benzene derivatives such as the diacetyl substituted diphenyl compounds, benzophenone, anthraquinone, benzal-acetophenone, benzil, and others.

The reactant monomers herein designated as unsaturated hydrocarbons containing from 1 to 2 olefinic double bonds per molecule which when copolymerized with an aromatic mono- or polyfulvene form the present resinous copolymerization products may be selected from the monoolefins, such as ethylene, propylene, n-butylene, isobutylene, amylene, isoamylene, and homologs of higher molecular weight; the diolefins such as butadiene-1,3, the various acyclic pentadienes, such as isoprene; the cycloalkadienes such as cyclopentadiene, cyclohexadiene, etc. and homologs of higher molecular weight, including the alkyl substituted cyclic dienes, and the unsymmetrical aryl substituted mono- and di-olefins, such as styrene, alpha-methyl-styrene, divinyl benzene, indene, vinyl toluene, vinylnaphthalene and other.

The copolymerization reaction of the present process between an aryl mono- or polyfulvene and an unsaturated hydrocarbon monomer containing from one to two olefinic double bonds per molecule usually proceeds readily by the mere application of heat to the mixture of monomers, yielding resinous polymers in the structure of which there is believed to be a considerable degree of cross linkage as evidenced by the fact that the product is ordinarily thermosetting and is insoluble in organic solvents such as alcohols, liquid hydrocarbons, etc. In effecting the copolymerization of the present reactants, however, it is generally preferred to conduct the polymerization in the presence of a catalyst which is compatible with the organic composition of the resultant product and which has a decided catalytic activity in accelerating the polymerization of the less readily polymerizable monomers. The latter, in general, contain fewer unsaturated double bonds per molecule than the more readily polymerizable polyolefinic monomers.

One of the principal advantages which accompany the use of a catalyst to effect the copolymerization reaction is that the copolymerization may be effected at somewhat lower reaction temperatures, at a more rapid rate, and with an accompanying greater control of the physical properties of the resulting product. A further advantage of a catalyzed copolymerization process is the fact that the resultant product is less highly colored than the corresponding thermal copolymer, presumably because of the generally lower reaction temperatures and shorter reaction period which may be employed with such catalyst. When utilized, the preferred catalysts are the organic peroxide type, including as typical representatives thereof such compounds as di-t-butylperoxide, benzoyl peroxide, ascaridole, t-butyl-perbenzoate, t-butyl-hydroperoxide, and the mixture of peroxidic compounds formed by subjecting certain types of hydrocarbons to ozonization or peroxidation, including such hydrocarbons as isoprene, diisobutylene, asym-diphenylethylene, cyclohexene, phellandrene, triphenylethane, and other hydrocarbons or hydrocarbon mixtures. The organic peroxides when incorporated into the reaction mixture may be allowed to remain in the resinous product upon completion of the copolymerization reaction, since the quantity of catalytic substance introduced into the mixture (usually from about 0.01 to about 1.0%, or even in some cases up to about 10% by weight of the reactants) is generally not sufficient to markedly alter the physical properties, such as the hardness or viscosity of the resultant copolymer. The catalyst is preferably introduced into the mixture of reactants at a relatively low temperature prior to the point at which any substantial amount of polymerization has occurred. It is also advisable whenever desired to control the rate of polymerization and reduce the degree of color developed in the copolymerization product to rapidly disperse the catalyst into the reactants and thereby obtain a uniform distribution of the peroxide catalyst throughout the mass of reactants before the temperature of the reaction mixture is increased to a point at which copolymerization occurs.

Emulsion copolymerization may likewise be employed for the present reaction and in such a system, the reactant monomers are desirably dispersed in an aqueous medium containing the catalyst in solution or in emulsion. A detergent or other emulsifying agent, such as soap, an alkyl sulfate, or an alkylaryl sulfonate may be dissolved in the aqueous medium prior to the addition of the reactant monomers thereto. Emulsification of the reactants in the aqueous medium during the copolymerization may generally be obtained by rapidly stirring or shaking the mixture, particularly in the presence of an emulsifying agent. The reaction temperature is generally limited in emulsion polymerization techniques to the boiling point of water, unless effected in a closed reactor system under pressure. The emulsion, following completion of the copolymerization, may be coagulated and precipitation of the copolymer from the emulsion is generally effected by the addition of an electrolyte such as an acid, or a salt such as sodium chloride to the emulsion, accompanied by stirring. The resulting copolymer precipitate may then be filtered and further processed, as, for example, by milling, to develop the desired physical properties of the product.

The reaction conditions suitable for effecting the present copolymerization process are necessarily determined by various factors, such as the ratio of individual reactant monomers utilized in the particular reaction, the presence or absence of a catalyst in the reaction mixture, and the quantity thereof, the degree of polymerization desired, etc. In general, the ratio of reactants required for complete copolymerization is directly proportional to the number of centers of polymerization activity in the monomer molecules, which generally depends upon the number of olefinic double bonds contained in the structure thereof. Thus, diolefins generally copolymerize more readily than monoolefins, although other groups present in the structure of the molecule may influence the activity of a mono-olefin bond to a greater extent than the influence of an additional double bond in the structure of the molecule. In the presence of a peroxide type polymerization catalyst, reaction temperatures of from about 25° to about 125° C. are generally sufficient to obtain substantially complete copolymerization of the reactant monomers, while in other instances, especially in the absence of a peroxidic catalyst, temperatures as high as 300° C. may be employed to advantage. The upper limit of the reaction temperature is also dependent upon the decomposition temperature of the monomers, as well as the depolymerization temperature of the resultant polymer product, so that the choice of a particularly preferred temperature for any system will depend upon a consideration of all of the above factors which control the reaction velocity. The preferred temperature for any system of reactants is also dependent upon the individual characteristics of the monomer reactants, and particularly their boiling points; the choice of the pressure variable, for example, is generally determined by the boiling points of the reactants, the pressure being sufficient to maintain a liquid phase of the reactants. Thus, in the case of ethylene as the olefinic monomer reactant, superatmospheric pressures up to about 300 atmospheres are generally preferable to obtain liquid phase conditions, the copolymerization being effected in a closed reaction system, such as a pressure autoclave.

The reaction period during which the mixture of aryl mono- or polyfulvenes and the unsaturated hydrocarbon monomer are copolymerized determines the physical properties of the resultant product to a considerable degree. The reaction period required to produce a product having given physical properties is also dependent upon the ease of polymerization of the reactant monomers, the temperature employed, and particularly upon the presence or absence of a catalyst in the reaction mixture. When utilizing a poly-fulveno-substituted reactant and a readily polymerizable unsaturated hydrocarbon containing olefinic unsaturation, reaction periods of less than 24 hours are generally sufficient to form a solid resinous copolymer, and in the presence of a peroxidic polymerization catalyst, the reaction period may be reduced to as low as one-half hour. In other cases, for example, when copolymerizing the less reactive monomers, such as the mono-fulvene aryl derivative in admixture with a straight chain mono-olefin at reaction temperatures below about 150° C., and particularly in the absence of a catalyst, the reaction period may be extended to as high as 100 to 150 hours, or even longer periods of time.

Since in many instances, the reactant monomers utilized in the present process are capable of undergoing independent polymerization at the conditions specified herein, the relative proportions of reacting monomers in the copolymerization reaction mixture is generally determined solely on the basis of the physical properties desired in the ultimate resinous product. Products having the greatest general utility are prepared from monomer mixtures containing from about 1 to 1 to about 20 to 1 weight proportions of the mono- or poly-fulvene aromatic reactant to unsaturated hydrocarbon reactant. Even when the relative proportion of the fulveno-substituted aromatic reactant in the mixture of monomers is low, it has been found that the properties of the resultant polymeric product are markedly different from the polymer obtained by the polymerization of the unsaturated hydrocarbon monomer alone. Styrene, for example, when polymerized alone, yields a hard, brittle polymer, whereas the inclusion of even a small amount of an aromatic fulvene in the copolymerization reaction mixture with styrene tends to result in the production of polymeric products possessing rubber-like properties.

It is within the scope of the present invention to provide a process in which the monomer or mixture of polymerizable monomers is reacted to a partially resinified state, the product in such case being a solid or semi-solid resinoid material which may then be molded or extruded in a heated mold to complete the resinification reaction. The product in the partially polymerized stage may also be further mixed with additional starting material of either the fulveno-substituted aromatic reactant or of the unsaturated hydrocarbon containing olefinic unsaturation or with another monomer wholly different from the original starting materials prior to the final resinification or molding operation. It is also practicable to effect the polymerization reaction in the presence of a solvent for the monomers, the solvent being subsequently removed by heating the resin at a subatmospheric pressure and/or at a higher temperature, if desired.

Resinous products obtained in the present process have wide-spread utility in the various arts depending in large measure upon the physical properties of the product. They may, for example, be composited with various drying oils, such as the unsaturated glyceride type or unsaturated hydrocarbon type to form varnish or paint composition and when employed for said purposes, the resins contribute valuable film-forming and bodying properties to such compositions. Protective coatings prepared from many of the present resins form a glossy surface resistant to most chemicals, water, and abrasive agents, and such compositions in which solid resins produced in the present process are incorporated, dry to hard, non-tacky films. In some cases, the products are useful as plasticizers, especially when said product is a semi-solid or viscous liquid resin. When solid resinous products are obtained, these may be melted or extruded into variously shaped articles or used to impregnate cellulosic materials such as paper and shaped wooden articles, or the resin may be heated with wood flour, wood chips, cotton linters, asbestos, or other fibrous materials to form semi-rigid or rigid structural shapes. The resinous products may likewise be vulcanized with sulfur to form products which are generally harder than the original resinous material and are therefore useful in the manufacture of linoleum, floor tile, structural boards, and the like.

The present invention is further illustrated with respect to specific embodiments thereof in the following examples, which, however, are not intended to determine the scope of the invention in strict accordance therewith.

EXAMPLE I p-Di-(6-methylfulveno)-benzene, in which the methyl groups are attached to the acyclic carbon atoms of the fulvene radicals, was prepared according to the following procedure: A mixture of 16.2 grams (0.1 mol) of p-diacetyl-benzene and 13.2 grams (0.2 mol) of cyclopentadiene in 150 cc. of methanol was poured slowly into a solution of 11.0 grams of sodium methylate in 50 cc. of methyl alcohol and the resulting solution allowed to stand for 10 minutes. The solution was then poured into 700 cc. of ice water and the difulvene extracted with petroleum ether.

An aliquot quantity of the petroleum ether solution of the difulvene prepared as indicated above containing the desired amount of difulvene was measured into a polymerization reactor and the solvent rapidly evaporated from the solution in vacuo. To the difulvene residue remaining after evaporation of the petroleum ether solvent, was added various amounts of styrene which was thoroughly mixed with the difulvene monomer and the resulting mixture heated to the designated temperature and for the designated reaction period indicated in the following table:

Table
COPOLYMERIZATION OF p-DI-(6-METHYLFULVENO)-BENZENE WITH STYRENE

| Styrene, Weight Per cent in Mixture | Time of Polymerization, Hrs. | Temperature of Polymerization, °C. | Viscosity of Copolymer Bubble Time [1] Seconds at 20° C. |
|---|---|---|---|
| 100 | 24 | 25 | 8.0 |
| 100 | 144 | 71 | Viscous Liquid. |
| 100 | 168 | 127 | Hard Solid. |
| 90 | 24 | 25 | 9.0 |
| 90 | 144 | 71 | 11.0 |
| 90 | 168 | 127 | Rubbery Solid. |
| 90 | 216 | 143 | Hard Solid. |
| 10 | 48 | 25 | Viscous Liquid. |
| 10 | 144 | 71 | Soft Solid. |
| 10 | 168 | 127 | Hard Solid. |

[1] Bubble time was employed to measure the viscosity of the polymerization mixture and as a rough indication of the degree of polymerization. The polymerization reactor, a sealed glass tube containing the monomers at 20° C. is inverted and the number of seconds time required for an air bubble to rise through the column of reactants is designated the "Bubble Time."

The above results indicate the marked change in the physical properties of poly-styrene occasioned by the incorporation of a small amount of the difulvenobenzene in the styrene and the subsequent copolymerization of the reactant monomers.

EXAMPLE II

A hard, plastic-like product is obtained by the copolymerization of p-di-(6-methylfulveno)-benzene, prepared as indicated above, with ethylene, by subjecting a mixture of the monomers contained in a sealed glass tube liner at an ethylene pressure of 60 atmospheres to a temperature of 200° C. for 6 hours. In effecting the copolymerization reaction, the difulvenobenzene (25.8 grams) was placed in a glass liner, mixed with 1 gram of ditertiarybutyl peroxide catalyst and the liner containing the mixture placed in an autoclave which was pressured to the indicated pressure with ethylene, the autoclave being rotated to effect mixing of the reactants as the autoclave was heated. The product was a hard, clear, infusible solid copolymer, differing in physical properties from the polymer of ethylene or of the difulvenobenzene individually.

EXAMPLE III 6-methyl-6-phenyl fulvene, prepared by the condensation of acetophenone and cyclopentadiene in a methanol solution of sodium methylate was copolymerized with butadiene-1,3 by the emulsion copolymerization method to form a rubber-like copolymer. 17.8 grams (0.1 mol) of 6-methyl-6-phenyl-fulvene and 10.8 grams (0.2 mol) of butadiene-1 3 were placed in a stoppered bottle and cooled to below 0° C. in a Dry Ice bath, followed by the addition thereto of 500 cc. of a 0.3% solution of sodium laurate and 1 gram of potassium persulfate. The bottle was then stoppered and sealed, attached to a mechanically driven shaker arm and suspended in a water bath at 70° C. as the mixture was vigorously shaken to form an emulsion. After three hours of such treatment, the mixture had the appearance of a milky white emulsion which did not separate into phases upon standing. The emulsion was removed from the shaker bottle and mixed with a small amount of a saturated solution of sodium chloride to precipitate the copolymer. The resulting semi-solid curd which formed was filtered and the residue put through a rubber mill to form a rubber-like solid polymer having elastic properties.

We claim as our invention:

1. A process for the production of a resinous material which comprises copolymerizing an aromatic monofulvene with an unsaturated hydrocarbon containing from one to two olefinic double bonds per molecule at a temperature of from about 25° to about 300° C.

2. The process of claim 1, further characterized in that said unsaturated hydrocarbon is an olefin containing from one to two double bonds per molecule.

3. The process of claim 1, further characterized in that said unsaturated hydrocarbon is an aromatic hydrocarbon containing from one to two alkenyl substituents.

4. The process of claim 3, further characterized is that said alkenyl-substituted aromatic hydrocarbon is styrene.

5. The process of claim 3, further characterized in that said alkenyl substituted aromatic hydrocarbon is indene.

6. A process for the production of a resinous material which comprises copolymerizing an unsaturated hydrocarbon containing from one to two olefinic double bonds per molecule with an aromatic monofulvene in which the fulveno substituent is attached to the aryl nucleus through the acyclic carbon atom of said fulveno radical in the presence of a peroxidic polymerization catalyst.

7. The process of claim 6, further characterized in that said peroxidic catalyst is benzoyl peroxide.

8. A process for the production of a resinous material which comprises copolymerizing at a temperature of from about 25° to about 300° C. an unsaturated hydrocarbon containing from one to two olefinic double bonds per molecule with an aromatic monofulvene in which the fulveno substituent is attached to the aryl nucleus through the acyclic carbon atom of said fulveno radical.

9. A process for the production of a copolymer having rubber-like properties which comprises copolymerizing an aromatic monofulvene with an unsaturated hydrocarbon monomer containing from one to two olefinic double bonds per molecule in the presence of a peroxidic polymerization catalyst and an aqueous solution of an emulsifying agent.

10. A process for the production of a resinous material which comprises copolymerizing 6-methyl-6-phenyl-fulvene with ethylene at a temperature of from about 50° to about 250° C. at a superatmospheric pressure in the presence of a peroxidic polymerization catalyst.

11. A process for the production of a resinous material which comprises copolymerizing an aromatic monofulvene with an unsaturated hydrocarbon containing from one to two olefinic double bonds per molecule in the presence of a peroxidic polymerization catalyst.

12. A process for the production of a resinous material which comprises copolymerizing an aromatic monofulvene with an unsaturated hydrocarbon containing from one to two olefinic double bonds per molecule in the presence of a peroxidic polymerization catalyst and at a temperature of from about 25° to about 300° C.

13. A co-polymer of 6-methyl-6-phenyl-fulvene and ethylene.

14. A co-polymer of 6-methyl-6-phenyl-fulvene and butadiene-1,3.

15. A co-polymer of an aromatic monofulvene and an unsaturated hydrocarbon containing from 1 to 2 olefinic double bonds per molecule.

RALPH B. THOMPSON.
HERMAN S. BLOCH.

REFERENCES CITED

The following references are of record in the file of this patent:

UNITED STATES PATENTS

| Number | Name | Date |
|---|---|---|
| 2,512,698 | Thompson et al. | June 27, 1950 |